(12) United States Patent
Kumar et al.

(10) Patent No.: US 10,095,663 B2
(45) Date of Patent: Oct. 9, 2018

(54) DELIVERY AND DISPLAY OF PAGE PREVIEWS DURING PAGE RETRIEVAL EVENTS

(71) Applicant: Amazon Technologies, Inc., Reno, NV (US)

(72) Inventors: Rohit Krishna Kumar, Seattle, WA (US); Scott Zachary Bressler, Seattle, WA (US); Ivan King Yu Sham, Seattle, WA (US); Ian William Stewart, Seattle, WA (US); Brett Richard Taylor, Bainbridge Island, WA (US); Peter Frank Hill, Seattle, WA (US); Aakarsh Nair, Seattle, WA (US); Steven Michael Reddie, Issaquah, WA (US); Patrick Joseph Armstrong, Seattle, WA (US); Samuel John Young, Seattle, WA (US); Ameet Nirmal Vaswani, Seattle, WA (US); Andrew Lynch Hayden, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 13/841,148

(22) Filed: Mar. 15, 2013

(65) Prior Publication Data

US 2014/0136942 A1    May 15, 2014

Related U.S. Application Data

(60) Provisional application No. 61/726,510, filed on Nov. 14, 2012.

(51) Int. Cl.
*G06F 17/21* (2006.01)
*G06F 17/22* (2006.01)
*G06F 17/30* (2006.01)

(52) U.S. Cl.
CPC ........ *G06F 17/212* (2013.01); *G06F 17/2247* (2013.01); *G06F 17/30902* (2013.01); *G06F 17/30905* (2013.01)

(58) Field of Classification Search
CPC .......... G06F 17/24; G06F 17/25; G06T 11/60; A63F 2300/5553; A63F 2300/6623
(Continued)

(56) References Cited

U.S. PATENT DOCUMENTS 5,500,933 A    3/1996  Schnorf
5,930,472 A    7/1999  Smith
(Continued)

FOREIGN PATENT DOCUMENTS

JP    09-204347    8/1997
JP    2008-077353    4/2008
(Continued)

OTHER PUBLICATIONS

Anonymous, "ShrinkTheWeb (STW) Website Previews Plugin", http://web.archive.org/web/20120710154658/http://wordpress.org/extend/plugins/shrinktheweb-website-preview-plugin/screenshots/, Jul. 10, 2012, 3 pages.
(Continued)

*Primary Examiner* — Andrew R Dyer
*Assistant Examiner* — Jenq-Kang Chu
(74) *Attorney, Agent, or Firm* — Knobbe, Martens, Olson & Bear, LLP (57) ABSTRACT

A system and process are disclosed for providing users with page previews during page loading events, such that the delay experienced before the display of page content is reduced. The previews may include screenshots of the pages or of portions thereof, and may be generated periodically and cached by the system for delivery to user devices. The process of generating and delivering the previews via the
(Continued)

Internet or some other network may be implemented partly or wholly within an intermediary system that sits logically between the user devices and content servers. The process may be used with existing browsers without the need for any browser modifications, or may be used with a "preview-aware" browser that includes special program code for providing page previews.

30 Claims, 4 Drawing Sheets (58) Field of Classification Search
USPC .............................. 715/201, 202, 230, 255
See application file for complete search history.

(56) References Cited

U.S. PATENT DOCUMENTS

| | | | |
|---|---|---|---|
| 5,978,842 A | 11/1999 | Noble et al. | |
| 5,982,392 A | 11/1999 | Anfossi et al. | |
| 6,061,715 A | 5/2000 | Hawes | |
| 6,230,168 B1 | 5/2001 | Unger et al. | |
| 6,271,840 B1 | 8/2001 | Finseth et al. | |
| 6,356,908 B1 | 3/2002 | Brown et al. | |
| 6,496,932 B1 | 12/2002 | Trieger | |
| 6,657,647 B1 | 12/2003 | Bright | |
| 7,051,084 B1* | 5/2006 | Hayton et al. | 709/219 |
| 7,191,211 B2 | 3/2007 | Tuli | |
| 7,296,230 B2 | 11/2007 | Fukatsu et al. | |
| 7,310,769 B1 | 12/2007 | Dash | |
| 7,356,570 B1 | 4/2008 | Tuli | |
| 7,499,051 B1 | 3/2009 | O'Donnell | |
| 7,917,618 B1 | 3/2011 | Bettis et al. | |
| 7,975,019 B1 | 7/2011 | Green et al. | |
| 8,103,742 B1 | 1/2012 | Green | |
| 8,200,896 B2 | 6/2012 | Schmieder et al. | |
| 8,234,392 B2 | 7/2012 | Graffagnino et al. | |
| 8,311,900 B1 | 11/2012 | Bates et al. | |
| 8,314,809 B1 | 11/2012 | Grabowski et al. | |
| 8,331,566 B1 | 12/2012 | Foote et al. | |
| 8,365,144 B1 | 1/2013 | Webb | |
| 8,539,338 B2 | 9/2013 | Zhu et al. | |
| 8,610,725 B2 | 12/2013 | Sandmel et al. | |
| 8,732,571 B2 | 5/2014 | Jain et al. | |
| 8,754,827 B2 | 6/2014 | Braghis et al. | |
| 8,769,052 B1 | 7/2014 | Tidd | |
| 8,913,067 B1 | 12/2014 | Kokkevis | |
| 8,913,068 B1 | 12/2014 | Kokkevis | |
| 8,943,197 B1 | 1/2015 | Taylor et al. | |
| 8,990,674 B2 | 3/2015 | Shibukawa et al. | |
| 9,075,893 B1 | 7/2015 | Jenkins | |
| 9,454,515 B1 | 9/2016 | Jain | |
| 9,563,928 B1 | 2/2017 | Sokolowski et al. | |
| 9,563,929 B1 | 2/2017 | Sokolowski et al. | |
| 9,720,888 B1 | 8/2017 | Jain et al. | |
| 9,922,007 B1 | 3/2018 | Jain et al. | |
| 2001/0038395 A1 | 8/2001 | Holtzblatt | |
| 2001/0032238 A1 | 10/2001 | Cronin, III et al. | |
| 2002/0015042 A1 | 2/2002 | Robotham | |
| 2002/0078134 A1 | 6/2002 | Stone et al. | |
| 2002/0091738 A1 | 7/2002 | Rohrabaugh | |
| 2002/0170053 A1 | 11/2002 | Peterka et al. | |
| 2003/0014478 A1 | 1/2003 | Noble | |
| 2003/0025716 A1 | 2/2003 | Colavin | |
| 2003/0046365 A1 | 3/2003 | Pfister et al. | |
| 2003/0158916 A1 | 8/2003 | Cronin, III et al. | |
| 2003/0200507 A1 | 10/2003 | Stern et al. | |
| 2004/0095400 A1 | 5/2004 | Anderson et al. | |
| 2004/0135784 A1 | 7/2004 | Cohen et al. | |
| 2004/0186861 A1 | 9/2004 | Phatak | |
| 2004/0239681 A1 | 12/2004 | Robotham et al. | |
| 2005/0131887 A1 | 6/2005 | Rohrabaugh | |
| 2005/0232227 A1 | 10/2005 | Jorgenson et al. | |
| 2005/0243097 A1 | 11/2005 | Cohen et al. | |
| 2005/0256836 A1 | 11/2005 | Awamoto et al. | |
| 2006/0031774 A1 | 2/2006 | Gaudette | |
| 2006/0064467 A1 | 3/2006 | Libby | |
| 2006/0277478 A1 | 12/2006 | Seraji et al. | |
| 2007/0150820 A1 | 6/2007 | Salvo | |
| 2007/0156972 A1 | 7/2007 | Uehara | |
| 2007/0192509 A1 | 8/2007 | Ohtsuka et al. | |
| 2007/0234229 A1 | 10/2007 | Ohtsuka et al. | |
| 2007/0263007 A1 | 11/2007 | Robotham et al. | |
| 2007/0271288 A1 | 11/2007 | Martin et al. | |
| 2007/0288841 A1 | 12/2007 | Rohrabaugh et al. | |
| 2008/0018658 A1 | 1/2008 | Bruno et al. | |
| 2008/0034292 A1 | 2/2008 | Brunner | |
| 2008/0055623 A1 | 3/2008 | Piersol et al. | |
| 2008/0077862 A1 | 3/2008 | Tolpin | |
| 2008/0120393 A1 | 5/2008 | Chen et al. | |
| 2008/0120626 A1 | 5/2008 | Graffagnino et al. | |
| 2008/0181498 A1 | 7/2008 | Swenson et al. | |
| 2008/0222273 A1 | 9/2008 | Lakshmanan et al. | |
| 2008/0229025 A1 | 9/2008 | Plamondon | |
| 2008/0235594 A1* | 9/2008 | Bhumkar | G06F 17/30991 715/738 |
| 2008/0295164 A1 | 11/2008 | Steiner et al. | |
| 2009/0002381 A1 | 1/2009 | Harper et al. | |
| 2009/0030976 A1 | 1/2009 | Shukla | |
| 2009/0033986 A1 | 2/2009 | Himpe | |
| 2009/0089448 A1 | 4/2009 | Sze et al. | |
| 2009/0100356 A1 | 4/2009 | Kujda | |
| 2009/0125799 A1 | 5/2009 | Kirby | |
| 2009/0158134 A1 | 6/2009 | Wang et al. | |
| 2009/0158141 A1 | 6/2009 | Bauchot et al. | |
| 2009/0177996 A1 | 7/2009 | Hunt et al. | |
| 2009/0189890 A1 | 7/2009 | Corbett et al. | |
| 2009/0228782 A1 | 9/2009 | Fraser | |
| 2009/0238279 A1 | 9/2009 | Tu | |
| 2009/0307428 A1 | 12/2009 | Schmieder et al. | |
| 2009/0307571 A1 | 12/2009 | Gowda et al. | |
| 2009/0307603 A1 | 12/2009 | Gowda et al. | |
| 2010/0027663 A1 | 2/2010 | Dai et al. | |
| 2010/0049785 A1 | 2/2010 | Stoyanov et al. | |
| 2010/0194753 A1 | 8/2010 | Robotham et al. | |
| 2010/0269152 A1 | 10/2010 | Pahlavan et al. | |
| 2010/0281402 A1 | 11/2010 | Staikos et al. | |
| 2011/0029904 A1 | 2/2011 | Smith et al. | |
| 2011/0074765 A1 | 3/2011 | Oterhals et al. | |
| 2011/0078333 A1 | 3/2011 | Jakubowski | |
| 2011/0078593 A1 | 3/2011 | Matsui | |
| 2011/0080955 A1 | 4/2011 | Shi et al. | |
| 2011/0145695 A1 | 6/2011 | Matsui | |
| 2011/0197126 A1 | 8/2011 | Arastafar | |
| 2011/0225520 A1 | 9/2011 | Watanabe | |
| 2011/0231746 A1 | 9/2011 | Rohrabaugh et al. | |
| 2011/0258532 A1 | 10/2011 | Ceze et al. | |
| 2011/0287750 A1 | 11/2011 | Watanabe et al. | |
| 2011/0302514 A1 | 12/2011 | Rinaudo et al. | |
| 2012/0001832 A1 | 1/2012 | Braghis et al. | |
| 2012/0022942 A1 | 1/2012 | Holloway et al. | |
| 2012/0030560 A1 | 2/2012 | Yano | |
| 2012/0047444 A1 | 2/2012 | Adar et al. | |
| 2012/0054166 A1 | 3/2012 | Jeremias | |
| 2012/0084663 A1 | 4/2012 | Momchilov et al. | |
| 2012/0102416 A1 | 4/2012 | Chmiel | |
| 2012/0110435 A1* | 5/2012 | Green | 715/234 |
| 2012/0117145 A1 | 5/2012 | Clift et al. | |
| 2012/0131441 A1 | 5/2012 | Jitkoff et al. | |
| 2012/0151094 A1 | 6/2012 | Cooke | |
| 2012/0151308 A1 | 6/2012 | Falkenberg | |
| 2012/0159308 A1 | 6/2012 | Tseng et al. | |
| 2012/0188280 A1 | 7/2012 | Charlesbois et al. | |
| 2012/0191735 A1 | 7/2012 | Duff et al. | |
| 2012/0215834 A1 | 8/2012 | Chen et al. | |
| 2012/0254727 A1* | 10/2012 | Jain | G06F 17/30905 715/234 |
| 2012/0254780 A1 | 10/2012 | Mouton et al. | |
| 2012/0256949 A1 | 10/2012 | Treat et al. | |
| 2012/0265802 A1 | 10/2012 | Shen et al. | |
| 2013/0050249 A1 | 2/2013 | Grabowski et al. | |
| 2013/0080895 A1 | 3/2013 | Rossman | |
| 2013/0145259 A1 | 6/2013 | Kiefer, III et al. | |
| 2013/0159923 A1 | 6/2013 | French et al. | |

(56) References Cited

U.S. PATENT DOCUMENTS

| | | |
|---|---|---|
| 2013/0185633 A1 | 7/2013 | Bunker et al. |
| 2013/0212462 A1 | 8/2013 | Athas |
| 2014/0012685 A1 | 1/2014 | Le Chevalier |
| 2014/0032964 A1 | 1/2014 | Neerincx |
| 2014/0053054 A1 | 2/2014 | Shen |
| 2014/0059421 A1 | 2/2014 | Chibisov et al. |
| 2014/0129920 A1 | 5/2014 | Sheretov et al. |
| 2014/0136951 A1 | 5/2014 | Kumar et al. |
| 2014/0136971 A1 | 5/2014 | Kumar et al. |
| 2014/0136973 A1 | 5/2014 | Kumar et al. |
| 2014/0281894 A1 | 9/2014 | Maity et al. |
| 2014/0281896 A1 | 9/2014 | Wiitala et al. |
| 2015/0026566 A1 | 1/2015 | Hui et al. |
| 2015/0089355 A1 | 3/2015 | Peng et al. |
| 2015/0117515 A1 | 4/2015 | Fu et al. |
| 2015/0121193 A1 | 4/2015 | Beveridge et al. |
| 2015/0193409 A1 | 7/2015 | Portnoy et al. |
| 2015/0242522 A1 | 8/2015 | Lin et al. |
| 2015/0271188 A1 | 9/2015 | Call |
| 2015/0293929 A1 | 10/2015 | Namgung |
| 2016/0162597 A1 | 6/2016 | Karppanen |
| 2017/0011017 A1 | 1/2017 | Jain |

FOREIGN PATENT DOCUMENTS

| | | |
|---|---|---|
| JP | 2011-123697 | 6/2011 |
| JP | 2011-524033 | 8/2011 |

OTHER PUBLICATIONS

Anonymous, "ShrinkTheWeb—Website Previews API Documentation", http://web.archive.org/web/20121029152521/http://www.shrinktheweb.com/uploads/STW_API_Documentation.pdf, Oct. 29, 2012, 4 pages.

International Search Report and Written Opinion in PCT Application No. PCT/US2013/069733, dated Jun. 30, 2014.

Bahl et al., "Advancing the State of Mobile Cloud Computing", MCS' 12, Jun. 25, 2012, pp. 21-27.

Björk et al., "West: A Web Browser for Small Terminals", CHI Letters, 1999, vol. 1, No. 1, pp. 187-196.

Buyukkokten et al., "Power Browser: Efficient Web Browsing for PDAs", CHI Letters, 2000, vol. 2, No. 1, Apr. 1-6, 2000, pp. 430-437.

Deboosere et al., "Thin Client Computing Solutions in Low- and High-Motion Scenarios", Third International Conference on Networking and Services (ICNS'07), 2007, pp. 6.

Dyken et al., "A Framework for OpenGL Client-Server Rendering", 2012 IEEE 4th International Conference on Cloud Computing Technology and Science, 2012, pp. 729-734.

Fox et al., "Experience With Top Gun Wingman: A Proxy-Based Graphical Web Browser for the 3Com PalmPilot", Middleware'98, Session 9, 1998, pp. 407-424.

Freytag et al., "Resource Adaptive WWW Access for Mobile Applications", Computers & Graphics, 1999, vol. 23, pp. 841-848.

Han et al., "Dynamic Adaptation in an Image Transcoding Proxy for Mobile Web Browsing", IEEE Personal Communications, Dec. 1998, pp. 8-17.

Stokes, Jon, "Amazon's Silk is More Than Just a Browser: It's a Cloud OS for the Client", http://web.archive.org/web/20121217033708/http://www.wired.com/insights/2011/09/amazon-silk, Sep. 28, 2011, pp. 4.

Tendulkar et al., "Abusing Cloud-Based Browsers for Fun and Profit", ACSAC '12, Dec. 3-7, 2012, pp. 219-228.

Wang et al., "Accelerating the Mobile Web with Selective Offloading", MCC' 13, Aug. 12, 2013, pp. 45-50.

Zavou et al., "Exploiting Split Browsers for Efficiently Protecting User Data", CCSW' 12, Oct. 19, 2012, pp. 37-42.

Esteveo, Martin, "Tiling in DirectX: Part 1", from gamedev.net, Jul. 24, 2000, 5pgs.

Esteveo, Martin, "Tiling in OpenGL", from gamedev.net, Dec. 12, 2000, 6 pgs.

Kokkevis, Vangelis "GPU Accelerated Compositing in Chrome" The Chromium Projects, 2012, 9 pages.

PCWorld, Hands-on: Chrome Remote Desktop app for Android makes remote PC access easy, available at http://www.pcworld.com/article/2144562/hands-on-chrome-remote-desktop-app-for-android-makes-remote-access-easy.html, published Apr. 16, 2014 (last accessed May 22, 2014), 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014), 2 pages.

Delwadia, Vipul, "RemoteME: Experiments in Thin-Client Mobile Computing", Thesis for Master of Science in Computer Science, Victoria University of Wellington, 2009, pp. 114.

Ku et al., "The Amazon Kindle Fire: Benchmarked, Tested, and Reviewed", http://www.tomshardware.com/reviews/amazon-kindle-fire-review,3076.html, Nov. 23, 2011, pp. 37.

Weintraub, Levi, "How WebKit Renders the Web", Fluent Conference, May 31, 2012, pp. 67. http://www.slideshare.net/naseemh/airbnb-tech-talk.

Xiao et al., "Browsing on Small Displays by Transforming Web Pages into Hierarchically Structured Subpages", ACM Transactions on the Web, Jan. 2009, vol. 3, No. 1, pp. 36.

Garsiel et al., "How Browsers Work: Behind the Scenes of Modern Web Browsers", http://www.html5rocks.com/en/tutorials/internals/howbrowserswork/, Aug. 5, 2011, pp. 52.

Grosskurth et al., "Architecture and Evolution of the Modern Web Browser", http://grosskurth.ca/papers/browser-archevol-20060619.pdf, Jun. 20, 2006, pp. 24.

Herostratus' Legacy, "Composited Video Support in WebKitGTK+", https://blogs.igalia.com/vjaquez/2013/07/26/composited-video-support-in-webkitgtk/, Jul. 26, 2013, pp. 8.

Stefanov, Stoyan, "Rendering: Repaint, Reflow/Relayout, Restyle", http://www.phpied.com/rendering-repaint-reflowrelayout-restyle/, Dec. 17, 2009, pp. 11.

Wiltzius, Tom, "Accelerated Rendering in Chrome", http://www.html5rocks.com/en/tutorials/speed/layers/, Mar. 11, 2013, pp. 11.

Xiao et al., "Web Page Adaptation for Small Screen Mobile Device: A New P2P Collaborative Deployment Approach", First International Conference on Intelligent Networks and Intelligent Systems, 2008, pp. 191-196.

Ranganathan et al., "A Lossless Image Compression Algorithm Using Variable Block Size Segmentation", IEEE Transactions on Image Processing, Oct. 1995, vol. 4, No. 10, pp. 1396-1406.

Vaisey et al., "Image Compression with Variable Block Size Segmentation", IEEE Transactions on Signal Processing, Aug. 1992, vol. 40, No. 8, pp. 2040-2060.

* cited by examiner

DELIVERY AND DISPLAY OF PAGE PREVIEWS DURING PAGE RETRIEVAL EVENTS

CROSS-REFERENCE TO RELATED APPLICATION

This application claims priority under 35 U.S.C. § 119(e) to U.S. Provisional Application No. 61/726,510 filed on Nov. 14, 2012, which is hereby incorporated by reference in its entirety.

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

I. Overview

A process is disclosed for providing users with page previews during page loading events, such that the delay experienced before the display of page content is reduced. The process may be implemented partly or wholly within an intermediary system that sits logically between user devices and content servers. In some embodiments, the process may be implemented by a content delivery network (CDN). The process may be used with existing browsers without the need for any browser modifications, or may be used with a "preview-aware" browser that includes special program code for providing page previews. When such "preview-aware" browsers are used, the process may be implemented by a third party server that does not act as an intermediary.

According to one embodiment, the intermediary system prefetches content pages, such as web pages, of various content sites, and generates and caches previews of these pages. The previews may include or consist of screenshot images ("screenshots") of the pages, such that minimal browser processing is required to display the previews. Different previews (e.g., with different screenshot resolutions) of the same page may be generated and cached for different user device types or form factors, such as smart phones, tablets, PCs, etc. In some embodiments, some or all of the links (or other active content) of the pages may be preserved when the previews are generated, such that users can, for example, select/follow links while viewing the preview. In some embodiments, a preview may not include any screenshots, or may include a combination of screenshot and non-screenshot files; for example, a preview can be delivered in two parts: a screenshot containing all of the non-textual of the page, and a textual overlay containing the page's textual content.

In one embodiment, when a user device requests a page for which a preview exists, the intermediary system returns a cached preview of the page as it retrieves the actual page (typically from a corresponding origin server). The browser running on the user device displays this preview while the intermediary system retrieves and delivers the page. (The intermediary system may pre-render or otherwise modify portions of the actual page before delivering it to browser.) The preview may continue to be displayed as the browser renders the page in the background. Once the actual page is loaded, the browser updates the display by replacing the preview with the actual page. If the user scrolls down or zooms in on the preview before this update occurs, the browser preferably applies such scrolling or zooming to the actual page when updating the display.

In some embodiments or use cases, rather than returning the actual page, the intermediary system may only return one or more portions of the page. For example, the intermediary system may only return the portions that differ (or differ in a meaningful way) from the preview, or may only return those portions that were delivered as screenshots. In these embodiments, the browser may be configured to update the display of the page preview by replacing or overwriting one or more specific portions of the preview.

The intermediary system may, in some embodiments, predictively prefetch pages for particular users during browsing sessions of such users, and may generate and cache (or preemptively deliver) previews of these pages. For example, when the intermediary system retrieves a page on behalf of a user/device, it may predictively follow some or all of the links on the page, and generate previews of these pages. If the user subsequently selects one of the predictively followed links, the intermediary system may then deliver the preview as described above. Where predictive prefetching is implemented, the intermediary system may maintain copies of users' cookies, and may transmit the relevant cookie when predictively following a link; thus, the predictively prefetched pages (and their previews) may be personalized for users.

II. System Components (FIG. 1)

Figure 1:
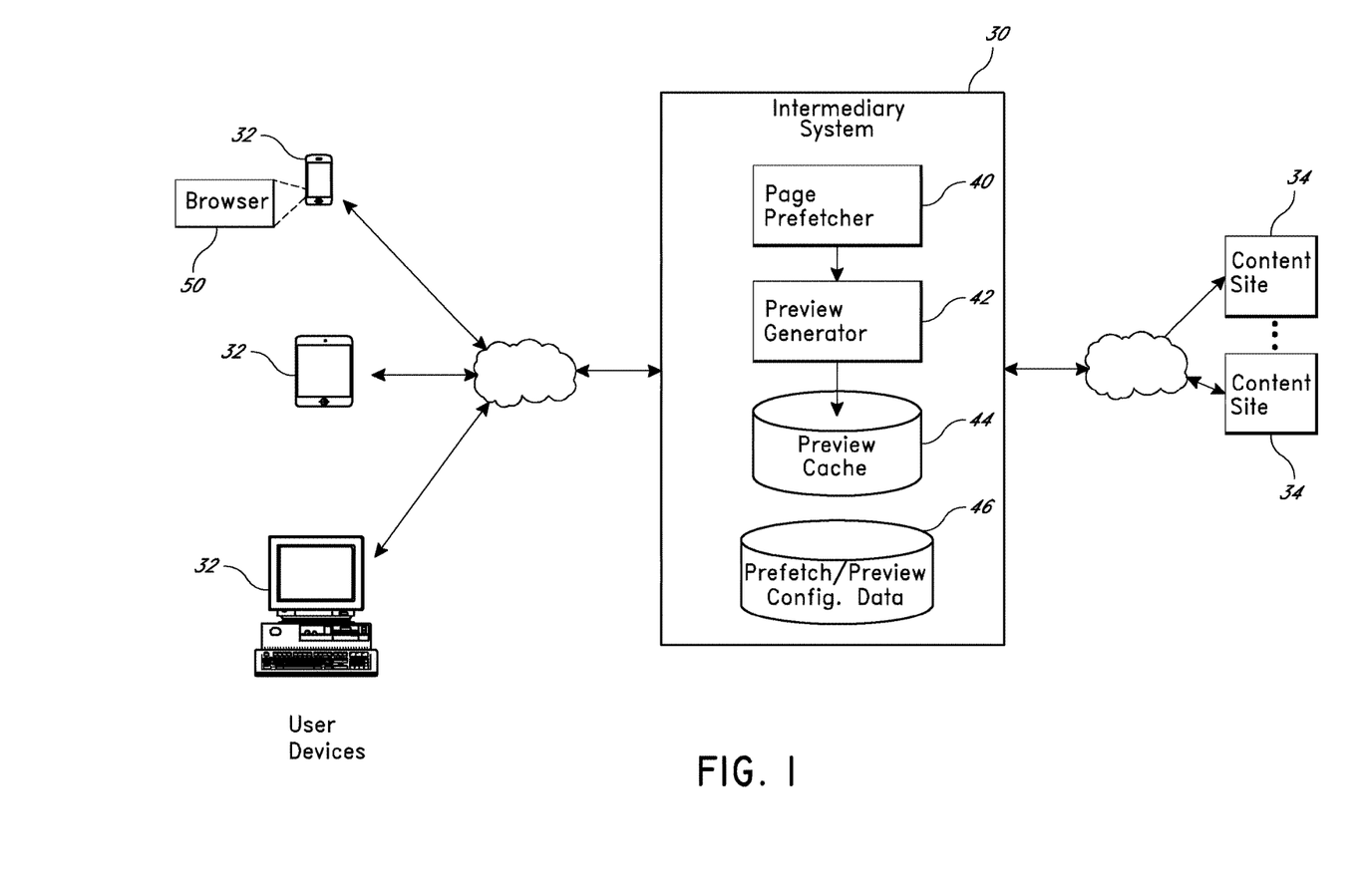
FIG. 1 illustrates an intermediary system that generates and delivers previews of content pages according to one embodiment.

FIG. 1 illustrates one embodiment of an intermediary system 30 capable of operating as described above. The intermediary system 30 serves as an intermediary between user devices 32 (e.g., smart phones, tablets, PCs, e-book readers, etc.) and content sites 34, such as web sites. In some embodiments, the intermediary system may, for example, be or act as a proxy server, a partial rendering engine for specific browsers or device types, a CDN, an Internet Service Provider ("ISP") system, or a combination thereof. Each user device 32 runs a browser application 50 ("browser") capable of retrieving and displaying content pages according to standard protocols. The browsers 50 may be designed or configured to retrieve web pages via the intermediary system 30. In some embodiments, the browsers 50 may be (or may include) conventional web browsers that are not specifically designed or configured to display page previews. In other embodiments, the browsers 50 may be specifically designed to handle specific tasks associated with the display of page previews.

The content sites 34 may include or consist of ordinary web sites. The pages for which page previews are generated can be conventional web pages that do not include any special coding or formatting to support the generation of previews as described herein. In some embodiments, however, the intermediary system 30 may support the use of special preview tags for designating whether or how page previews should be generated for particular pages. Where preview tags are supported, a content provider may, for example, embed tags in a content page indicating, for example, which visual elements or sections of the page should be converted into screenshots.

As shown in FIG. 1, the intermediary system 30 includes a page prefetcher 40, a preview generator 42, a preview cache 44, and a data repository 46 of prefetch/preview configuration data. The page prefetcher 40 is responsible for prefetching pages from various content sites 34 for purposes of generating page previews. The pages that are prefetched may, for example, be (1) pre-selected by administrators, (2) selected automatically based on page popularity data (as measured, e.g., based on page requests processed by the intermediary system), and/or (3) identified by predictively following links of pages being loaded by user devices. For some or all of the pages selected for prefetching, the page prefetcher 40 may prefetch each page periodically at a regular interval, such as every 1 to 3 minutes. This interval may be fixed, or may vary on a per-page or per-site basis based, e.g., on a measure of how frequently meaningful changes are made to the page or site content.

Each time a page is prefetched, the preview generator 42 generates a preview of the prefetched page, and stores the preview in the cache 44 in place of the most recently generated preview. The preview generator may generate and cache multiple previews of the same page, with each being tailored to a particular device or device characteristic (e.g., screen size, browser, touch screen versus non-touch screen, etc.). The previews may include or consist of screenshots of the prefetched pages or portions thereof. In some embodiments, the previews may also include HTML code, including HTML image maps that enable users to select links depicted in the screenshots and access the linked content.

As depicted by the data repository 46, various types of configuration data may be maintained and used to control the process of prefetching pages and generating page previews. This data may include, for example, a list of the sites or pages that are eligible for prefetching, data regarding prefetch intervals to be used for particular pages or sites, and data regarding the devices or device characteristics for which previews are to be generated. As mentioned above, the intermediary system 30 may also maintain copies of the browser cookies stored on particular user devices 32, and may use these cookies to predictively prefetch pages for specific users.

In addition or as an alternative to using a page prefetcher 40, the intermediary system 30 may generate the previews from page content retrieved by the intermediary system 30 on behalf of the user devices.

III. Page Deliver Process Flow (FIG. 2)

Figure 2:
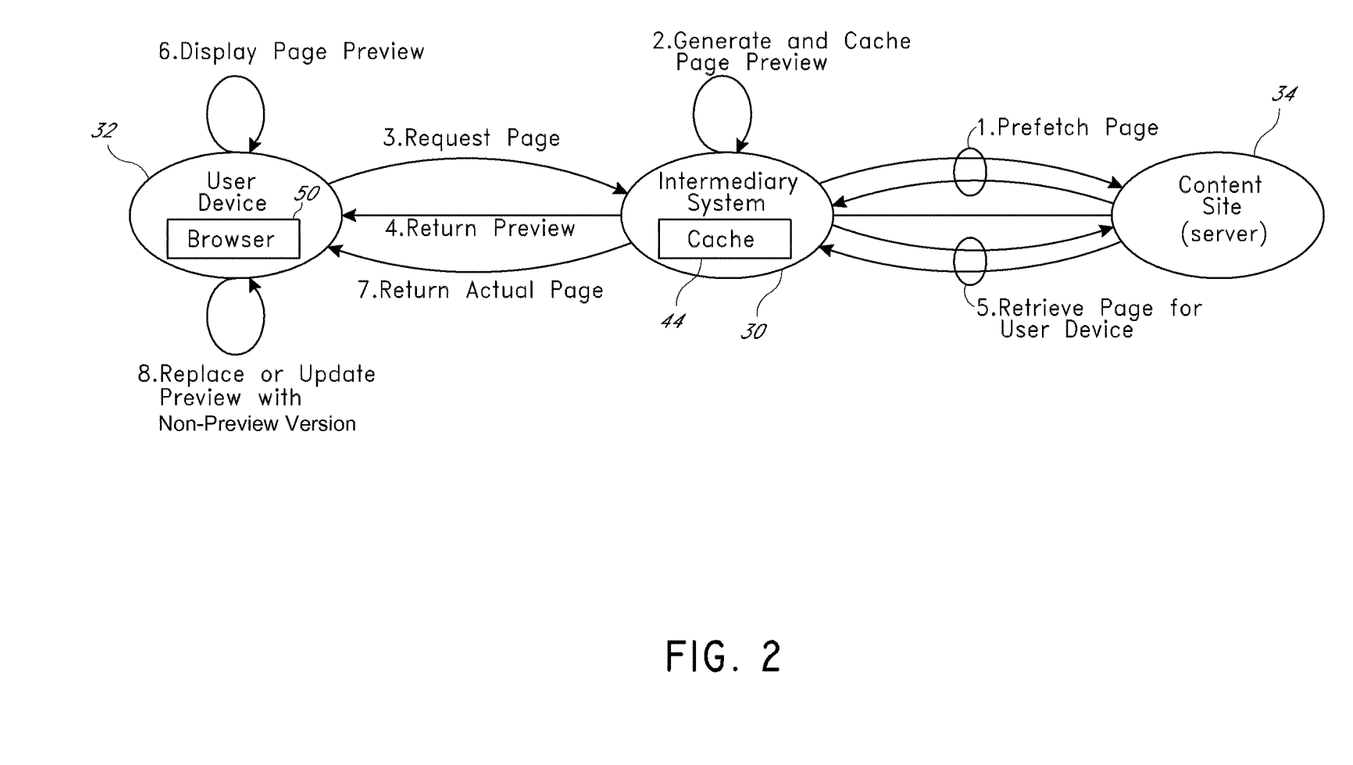
FIG. 2 illustrates the process by which a page preview may be generated, and temporarily displayed on a user device while the actual page is loading, according to one embodiment.

FIG. 2 illustrates the general process by which the intermediary system 30 may prefetch pages and handle browser requests according to one embodiment. In event 1, the intermediary system 30 prefetches a page from a content site 34. As mentioned above, this prefetch event may occur according to a periodic schedule, or may be performed predictively based on another page requested by the user device 32. If performed predictively, the intermediary system 30 may, in some embodiments, send a cookie corresponding to the user device 32 and content site 34 with the page request. In this way, the content site 34 may return a page that is personalized for the particular user, and a screenshot of the personalized page may be generated. As mentioned above, prefetching of pages is not essential. Although the page is shown as being retrieved from a single content site or server, some components of the page (such as images or advertisements) may be retrieved from separate servers and domains.

In event 2, the intermediary system 30 generates and caches a preview of the page. If the page was prefetched without use of a cookie corresponding to the user device 32, the intermediary system 30 may subsequently deliver this preview to any user device that subsequently requests the page. If prefetched using a cookie, the preview may be designated as being personal to the user device 32, or to a user or user account associated with the user device 32.

When generating the preview, the intermediary system 30 may generate a screenshot of the entire page, or may generate multiple screenshots, each of a different respective portion of the page. To preserve active content (links and other selectable elements) on the page, the preview generator may also generate an image map for each screenshot. Each such image map specifies the coordinates within the screenshot of one or more hot spots, and specifies the target URL of each such hot spot, as is known in the art. To reduce the complexity of the image maps, the intermediary system 30 may, in some cases, only include hot spots of some of the links on the page, such as those that are selected the most frequently by users. In some cases, the intermediary system may, in generating a page preview, store some or all of the page's text in a non-image format; for example, the intermediary system 30 may create a text overlay file that can be combined by the browser 50 with an image file to produce the page preview.

In event 3, the user device 32 subsequently requests the page. In events 4 and 5, which may overlap in time (e.g., may be performed in parallel) or be performed in a different order than shown, the intermediary system 30 responds to the page request by (a) returning the cached page preview to the user device 32, and (b) retrieving the requested page from the content site 34 on behalf of the user device 32. The process used to deliver the preview in event 4 may depend on whether the device's browser 50 supports the display of page previews. If it does not, as in the case of a conventional browser, the intermediary system 30 may first return a special HTML file, referred to herein as an HTML preview file, that instructs the browser 50 to retrieve one or more cached screenshots (or other cached preview objects) from the intermediary system 30. This process will be discussed below with reference to FIG. 3.

In event 6, which may overlap with event 5 and/or event 7, the browser 50 displays the page preview. Typically, the page preview is displayed noticeably faster than the actual page would be displayed if no previews were delivered. There are a several reasons for this. First, because the preview is already cached on the intermediary system 30, the round trip delay associated with retrieving the page from the content site 34 is avoided. Second, the additional round-trip delays associated with requesting any embedded objects from the content server 34 or a third party server (e.g., a CDN server) are typically avoided. Third, depending upon the process used to generate the preview, the preview may be capable of being delivered and displayed more rapidly than the actual page. For example, complex coding that ordinarily results in a browser 50 processing delay may be omitted from the preview, allowing it to be displayed more rapidly upon its arrival.

The speed at which the preview is delivered and displayed can be further increased by optimizing the previews for specific device types or form factors. For example, a lower screenshot resolution may be used for smart phones versus tablets, so that the screenshots can be delivered faster. (The screenshot resolutions may also be selected based on aggregated, browser-reported data regarding how frequently and quickly mobile device users tend to zoom-in on the particular page or on pages in general.) As another example, a page may be subdivided (for purposes of generating multiple screenshots) based on the screen dimensions of the user device. For example, one screenshot may be generated for the "above-the-fold" portion of the page that, given the device's screen dimensions, would appear on the screen when the page is first displayed. One or more additional screenshots may be generated of the remainder (below-the-fold) portion of the page to which the user can scroll, if desired. With this approach, the above-the-fold screenshot may be delivered and displayed first, so that the above-the-fold portion of the preview is displayed faster than would be possible if a single screenshot were used for the entire page.

In some embodiments or use cases, the intermediary system 30 may only deliver the above-the-fold screenshot, such that no below-the-fold content is included in the preview. This may be suitable or desirable where the user is unlikely to scroll down on the page during the preview-display stage. The intermediary system 30 may determine whether to use this approach for a particular page based on one or more factors, such as (1) data regarding how frequently (and how quickly) users scroll down on the particular page, and (2) the estimated amount of time the preview will be displayed before it is replaced with the actual page.

In event 7, the intermediary system 30 delivers to the browser a non-preview version of the page based on the page content retrieved in event 5. This non-preview version may be identical in format to the page retrieved in event 5, or may be a modified or partial version of it. The intermediary system may modify or optimize the retrieved page in various ways to generate the non-preview version, For example, the intermediary system 30 may reduce the resolutions of selected images on the page to enable them to load faster, especially for mobile devices. As another example, the intermediary system may generate and deliver a single file that fully represents the entire page, including embedded images or objects that would ordinarily be separately retrieved by the browser. As yet another example, the intermediary system may only deliver certain portions of the page, such as portions that differ or were omitted from the preview. Thus, the non-preview version delivered in event 7 may differ in format from the page retrieved in event 5, and/or may be an incomplete representation of the actual page.

In some embodiments, the user device 32 may retrieve the actual page from the content site 34, rather than receiving a non-preview version of the page from the intermediary system 30. In such cases, the user device 32 may transmit an initial request to the intermediary system 30 for the preview, and subsequently (or in parallel) request the actual page from the content site 34. The user device 32 or the browser 50 executing thereon may be configured to initially request previews from an intermediary system 30 while still retrieving the actual page from the content site 34. Alternatively, the preview or other data that the intermediary system 30 sends to the user device 32 may instruct the browser 50 to retrieve the actual page from the content site 34 rather than waiting to receive it from the intermediary system 30.

As the non-preview version is loaded on the user device 32, it is maintained hidden by the browser. For example, the non-preview version may be loaded into a hidden "tab," browser window, or other content display element supported by the browser 50. Events 5 and 7 in FIG. 2 may overlap, such that the intermediary system 30 delivers portions of the non-preview version of the page while retrieving other portions. As mentioned above, in other embodiments the intermediary system 30 may only deliver certain portions of the actual page, such as those portions that differ (or differ meaningfully) from the preview.

In event 8, the browser 50 replaces the display of the preview with a display of the non-preview version based on the content received in event 7. (If the intermediary system 30 only delivers the portions that differ from the preview, the browser 50 may alternatively update the preview by replacing the relevant portions.) For example, if the non-preview version was loaded and rendered into a hidden tab, the hidden tab may be un-hidden or otherwise made visible, while the tab in which the preview was displayed may be hidden. In typical use case scenarios, this transition occurs a few seconds after the display of the preview. From the user's perspective, the transition from the preview to the actual (non-preview) page is typically similar in appearance to the transition that occurs when a conventional browser finishes loading a page. Thus, the user typically will not be aware that a transition from a preview to the actual page is occurring. Typically, the visual content of the actual page will be the same or similar to that of the preview, especially if the intermediary system 30 generates previews of the page on a frequent basis (e.g., every few minutes).

In some embodiments, the intermediary system 30 may programmatically determine, at the time of a page request, whether to deliver a preview of the requested page. This determination may be based on a variety of factors, such as one or more of the following: (1) the connection speed between the user device 32 and the intermediary system 30, or between the content site 34 and the intermediary system 30, (2) the size and complexity of the requested page, as may be known to the intermediary system 30 based on previous accesses to the page, (3) the average delay (or most recent delay) encountered by the intermediary system 30 when retrieving this page, or when retrieving pages of the target site generally, (4) the frequency with which the content of the page changes.

IV. Delivery Process for Existing Browsers (FIG. 3)

Figure 3:
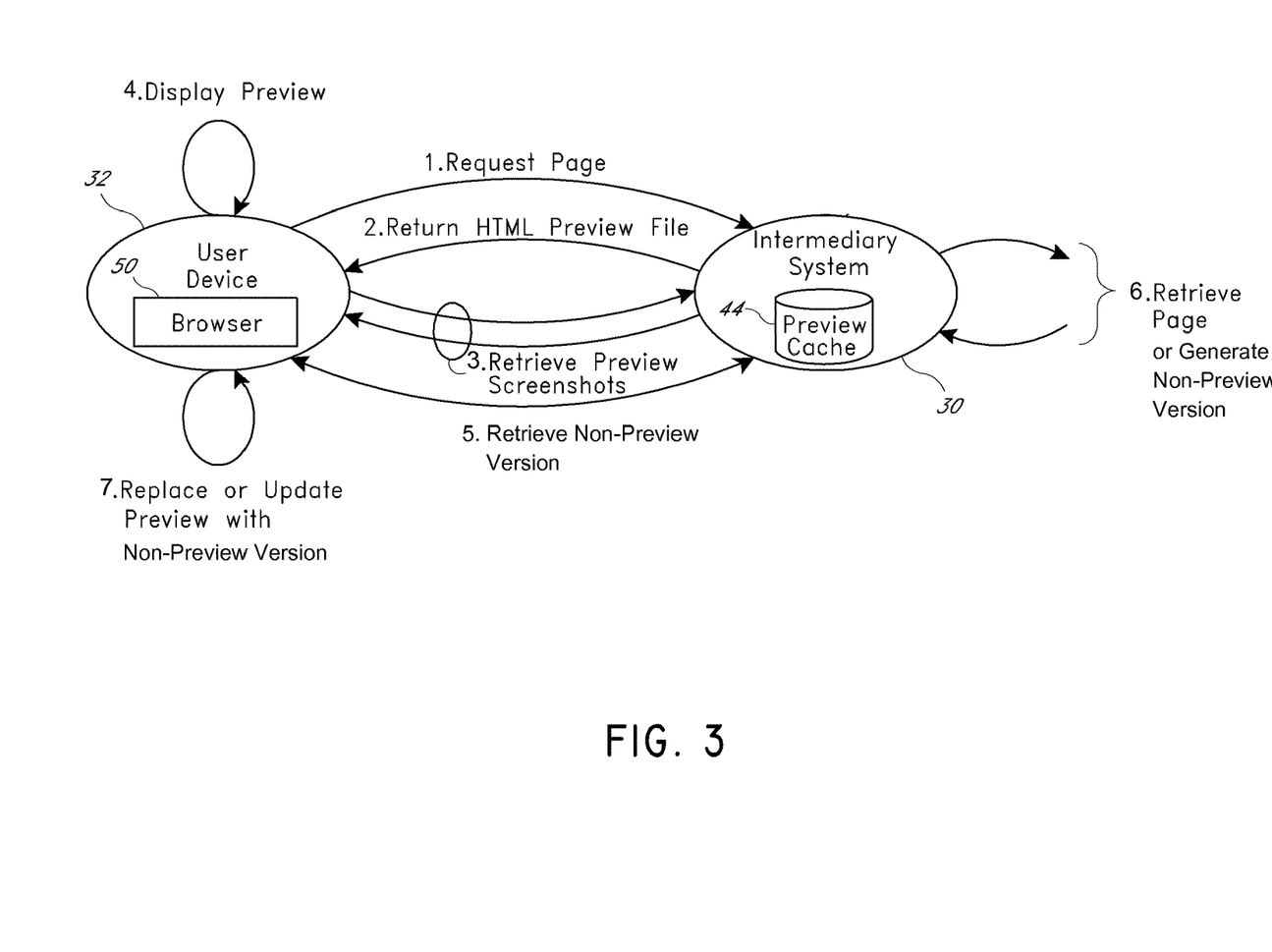
FIG. 3 illustrates a process that may be used with existing browsers to deliver and temporarily display the page previews.

FIG. 3 illustrates a process that may be used to provide page previews within preexisting browsers (i.e., those that are not "preview-aware"). It is assumed in this example that the intermediary system 34 already has a preview of the page in its cache 44. In event 1 of FIG. 3, the browser 50 sends a request to the intermediary system 30 for the page. In event 2, the intermediary system 30 returns an HTML preview file instead of the actual page. The HTML preview file specifies the screenshot(s) to be retrieved by the browser 50 from the intermediary system 30, and may include an image map for each such screenshot, as described above. One example of such a preview file is shown in table 1, with the image map removed and replaced with the text "[IMAGE MAP GOES HERE]."

TABLE 1

```
<!DOCTYPE html>
<html>
<head>
<title>CNN.com - Breaking News, U.S., World, Weather, Entertainment
& Video News</title>
<style>
html, body {padding: 0; margin: 0; width: 100%; height: 100%;}
.mainFrame {border: none; position: absolute; top: 0px; left: 0px;
padding: 0; margin: 0; width: 1002px; height: 3618px;}
#frame {display: none;}
</style>
<noscript>
<meta http-equiv="refresh" content="0;
URL=http://www.cnn.com/?screenshot bypass=1" />
</noscript>
</head>
<body>
<img id="image" src="http://static-
screenshots.s3.com/screenshots/f84bcecf-4f22-480b-9b6c-
dfe5f206089b.jpg"
alt="" usemap="#screenshot_map" />
<map name="screenshot_map" id="image_map">
[IMAGE MAP GOES HERE]
</map>
<iframe id="frame" class="mainFrame"
src="http://www.cnn.com/?screenshot bypass=1"
scrolling="no"></iframe>
<script type="text/javascript">
(function( ) {
    var image = document.getElementById("image");
    var frame = document.getElementById("frame");
    var map = document.getElementById("image_map");
    frame.onload = function( ) {
        frame.style.display = "block";
        image.style.display = "none";
        image.parentElement.removeChild(image);
        image = null;
        map.parentElement.removeChild(map);
        map = null;
        var frameHead =
frame.contentDocument.getElementsByTagName("head");
        if (frameHead) {
            var baseTarget =
frame.contentDocument.createElement("base");
            baseTarget.setAttribute("target", "_parent");
            frameHead[0].appendChild(baseTarget);
        }
    }
})( );
</script>
</body>
</html>
```

In event 4, the browser 50 may retrieve the preview screenshot(s) referenced in the HTML preview file. The HTML preview file shown in Table 1 corresponds to a page associated with CNN.com, and references a single screenshot named f4bcecf-4f22-480b-9b6c-dfe5f206089b.jpg. As described herein, multiple screenshots may be used in some embodiments. Illustratively, the screenshot referenced in the HTML preview file shown in Table 1 is not retrieved from http://www.cnn.com or some associated server, but rather from http://static-screenshots.s3.com, which may correspond to the intermediary system 30 or some other server or system associated with the intermediary system 30. The screenshot is of the entire page, and the image map specifies the coordinates of some or all of the links on the page. The user can select/follow links on the page while viewing preview file.

In some embodiments, user interface features other than image maps may be included in the preview. For example, if a content page includes "onmouseover" or "onhover" features that initiate display of supplemental content (e.g., descriptions of items over which a user hovers a mouse), such features may be included in the preview. In additional embodiments, inclusion of such additional user interface features may be based on the characteristics and capabilities of the target user device. For example, if a target device has only a touch screen input and not a mouse input, then the additional processing required to add an "onmouseover" or "onhover" event handler to a preview file may be skipped because such a feature is not easily accessible on the target device. As another example, layout hints or data regarding the structure of the actual content page may be provided along with or for use with the preview. For example, the layout of "div" markup tags may be provided so that features such as double-tap to zoom work as expected with the preview.

The screenshot is initially the only object of the HTML body that is visible to the user. The particular screenshot that is specified may be selected by the intermediary system 30 based on characteristics of the user device 32, such as its form factor or screen size. The characteristics of the device 32 may be communicated to the intermediary system 30 with the page request, or may be looked up by the intermediary system 30 based on a cookie or other identifier transmitted with the page request.

In event 5, the browser 50 may begin the process of preparing a non-preview version of the page for display. A container element, which in this example is an "iframe" element that has been given the ID "frame," is used to load the current version of the page. In some embodiments, a different container element may be used, such as a "div" or "object" element. As seen in the "frame.src" attribute of the sample HTML file in Table 1, the content of the iframe element is a document located at the http://www.cnn.com URL. The intermediary system 30 has appended the query string "?screenshot_bypass=1" onto the end of the URL. This query string may not be passed to the origin server or some other server associated with http://www.cnn.com. Rather, the query string may be an indicator to the intermediary system 30 that this particular request for the page located at http://www.cnn.com is for the actual page, and not for the screenshot. The presence of the query string "?screenshot_bypass=1" indicates that the HTML preview file has already been transmitted to the user device 32. In some embodiments, other techniques may be used to signal to the intermediary system 30 that a request should be serviced with the actual page rather than a screenshot. For example, cookies, self-posting forms, HTTP headers, and the like may be used to transmit information back to the intermediary system 30.

In event 6, the intermediary system 30 can retrieve the requested page from the origin server, a CDN server, or some other content source associated with the content site 34. In some embodiments, the intermediary system 30 augments the retrieved (actual) page with JavaScript code, or other executable code, that instructs the browser 50 to display the page once the actual page (with or without modifications by the intermediary system) has finished loading. This may be accomplished using a JavaScript "onload" event. As mentioned above, the intermediary system 30 may also make other changes to the page (e.g., reduce resolutions of images) to better optimize it for delivery to and display on particular types of devices.

In event 7, the browser 50 can process and display the non-preview version of the page. As seen in the "frame.onload" attribute, the iframe element is associated with a JavaScript function that executes when the content of the iframe (e.g., http://www.cnn.com) finishes loading. In particular, when the content of the iframe element finishes loading, the function defined in the "frame.onload" attribute executes instructions to display the iframe (e.g., "frame.style.display=block;") and then hide the screenshot (e.g., "image.style.display=none;"). In some embodiments, the order may be reversed, such that the image is first hidden and then the iframe is displayed.

In some embodiments, additional steps can be taken to make sure the iframe is loaded with a reasonable representation of the final size of the contents within so that scrolling the final document works seamlessly. A <base> tag can be added to the <head> of the document that is loaded into the iframe so that links clicked within the iframe itself are loaded in the parent document, not within the iframe. Finally, the screenshot image can be removed when the iframe loads to alleviate processing and storage pressure on the browser 50.

V. Implementations Using Preview-Aware Browsers

With further reference to FIG. 3, if a preview-aware browser 50 is used, event 6 may be omitted, and events 2 and 4 may be replaced with a single event in which the intermediary system 30 delivers the preview. The preview-aware browser 50 may also include other functionality for supporting the display of previews. For example, the browser 50 may include a user settings menu (or a link to a settings page) for enabling the user to specify one or more of the following: (1) whether previews should be displayed, (2) the conditions under which previews should be displayed (e.g., only when Wi-Fi is available, only for particular sites, etc.), (3) what screenshot resolutions should be used for previews, (4) whether advertisements should be omitted from the previews, (5) whether a "preview-only" browsing mode (described below) should be used, (6) whether the intermediary system 30 should perform predictive prefetching (as described above), and if so, whether the user's cookies should be used to support personalized previews. Where predictive prefetching is used, the preview-aware browser 50 may also be capable of receiving and caching the previews in the background, such that a predictively generated preview may be delivered to the user device 32 before the corresponding page is requested.

The preview-aware browser 50 may also include other functionality for enabling the intermediary system 30 to customize or personalize the process for particular users. For example, the browser 50 may collect and report usage data regarding how frequently the user zooms-in on and scrolls down on the preview pages. The intermediary system 30 may use this data to, for example, select the particular screenshots that are best suited for the user's browsing behaviors. The preview-aware browser 50 may also report to the intermediary system 30 other information that may be useful for selecting appropriate screenshots, such as information regarding the user device's processing power, screen size, number of applications running, etc. Further, the preview-aware browser may support one or more special touch screen gestures for interacting with previews. One example of such a gesture is described below.

The preview-aware browser may also support the ability for the intermediary system 30 to deliver only those portions of the actual page that differ or were omitted from the preview. For example, once a preview has been delivered, the intermediary system 30 may, by performing a comparison, determine that a particular section of the page has changed, and may deliver to the browser 50 an HTML sequence corresponding to this section. The preview-aware browser may then replace only that portion of the preview, without replacing any other portions of the preview. As another example, the preview may only include some of the pixel data of an image on the page, in which case the intermediary system may subsequently deliver—and the preview-aware browser fill in—the omitted pixel data.

The preview-aware browser 50 may also include special functionality for rendering previews. For example, as mentioned above, the intermediary system 30 may be configured to deliver both (1) an image file representing the image content of the page, and (2) a non-image overlay file, such as an HTML file, containing the textual content in non-image format. In such embodiments, the browser 50 may be configured to combine these two types of files to generate the preview.

Where this method is used, the intermediary system 30 may, where applicable, subsequently send a new overlay file (without sending a new image file) that is based on the page retrieved in event 5 of FIG. 2. Thus, for example, if the page includes personalized textual content not included in the preview, the intermediary system may just send a new overlay file containing this personalized content; the preview-aware browser would then update the display of the preview using the new overlay file, without changing the image content.

VI. Preview-Only Browsing Modes

In some embodiments, the system may support a "preview only" browsing mode in which the intermediary system 30, by default, only delivers the page previews (when available), and does not deliver the actual pages. Users may be able to enable and disable this mode via a browser setting, or through a configuration site. Where a preview-aware browser 50 is used, the browser 50 may support a special touch screen gesture that enables the user to request the actual page while viewing its preview. For example, if the user taps twice on a particular area of the screen, the browser could respond by requesting and loading the actual page.

VII. Process for Prefetching Pages and Generating Previews

Figure 4:
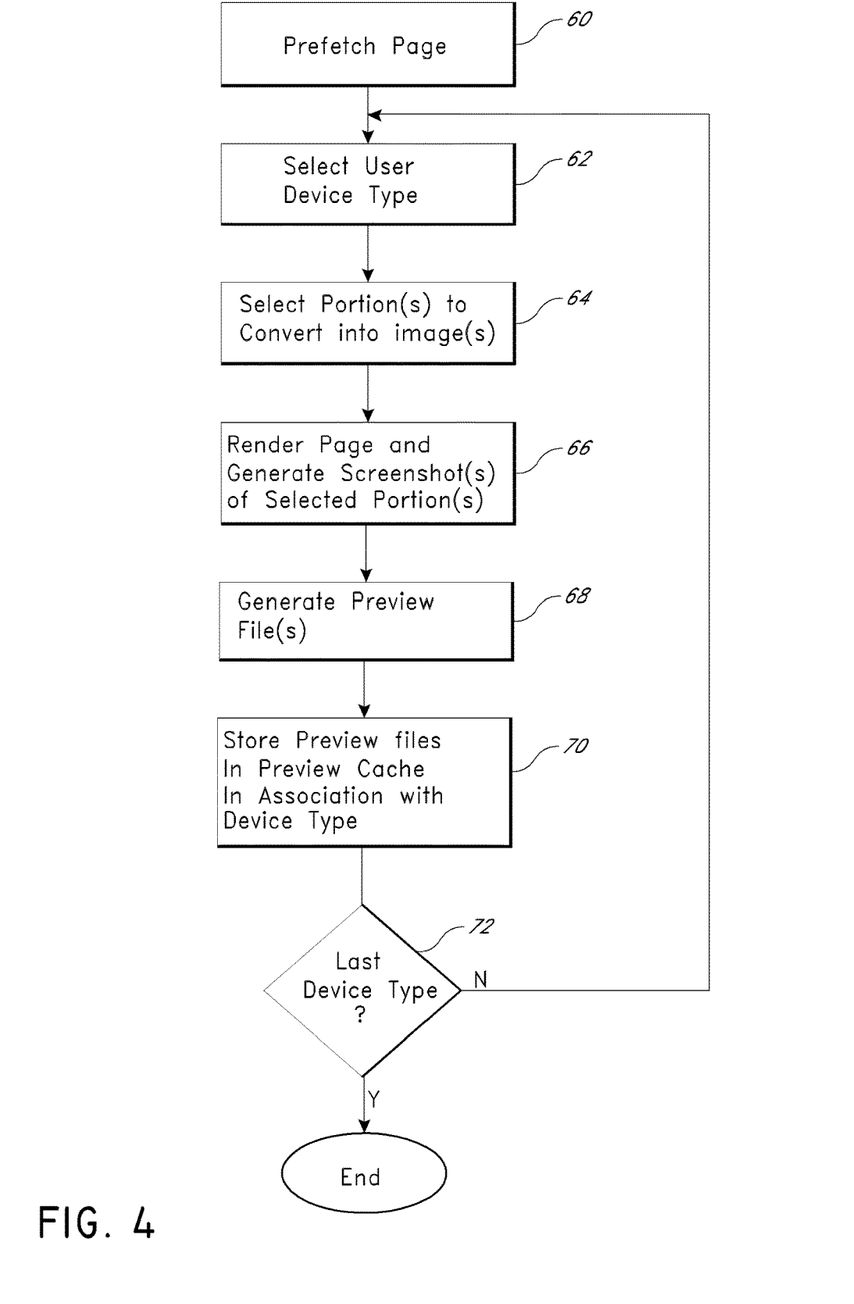
FIG. 4 illustrates a process that may be implemented by the intermediary system to prefetch, and generate previews of, content pages.

FIG. 4 illustrates one embodiment of a process that may be used by the intermediary system 30, and particularly the page prefetcher 40 and preview generator 42 (FIG. 1), to generate previews. This process may be repeated periodically (e.g., every few minutes) for a given page to maintain previews that are relatively up-to-date. In this particular embodiment, the preview generator 42 generates multiple previews for each prefetched page, which each preview corresponding to a different device type. The preview generator 42 may also generate different previews for preview-aware versus non-preview-aware browsers 50.

In block 60, the page prefetcher 40 prefetches a page from a content site 34. In block 62, the preview generator 42 selects the first device type for which to generate a preview. Different previews may, for example, be generated for different screen sizes, for different device connection speeds, for different browsers, etc.

In block 64 of FIG. 4, the preview generator 42 selects the particular portion or portions to convert to screenshots. In some embodiments, the preview generator 42 may generate a single screenshot of the entire page. In other embodiments, different screenshots may be generated of different portions of the page, as described above. In some cases, the preview generator 42 may generate screenshots only of certain portions of a page (e.g., those containing complex coding that would slow the rendering process), while leaving other portions in the page unchanged. The preview generator 42 thus may analyze the coding of a prefetched page to determine which portions, if any, should be converted to screenshots.

In block 66 of FIG. 4, the preview generator 42 renders the page and generates the screenshot(s) of the selected portion(s). In block 68, the preview generator 42 may generate one or more additional preview files, such as an HTML preview file as described above. In some embodiments, image maps, "onmouseover" event handlers, and other user interface features may be included in the preview in order to provide a user with functionality that the user may expect from the actual page or a non-preview version of the page. The inclusion of these and other user interface features can be based on the device to which the preview is targeted. For example, if a content page includes "onmouseover" or "onhover" features that initiate display of supplemental content (e.g., descriptions of items over which a user hovers a mouse), such features may be included in the preview if the target device is capable of activating such feature (e.g., a desktop computer with a mouse can activate "onhover" events, while a tablet computer with only a touch screen may not be able to do so). As another example, layout hints or data regarding the structure of the actual content page may be provided along with or for use with the preview. For example, the layout of "div" markup tags may be provided so that features such as double-tap to zoom work as expected with the preview.

In block 70, the preview file or files, including any screenshots, are stored in the preview cache 44 in association with the selected device type (e.g., with data indicating to which device types or characteristics the particular screenshots apply). As depicted by block 72, the process may then be repeated for one or more additional device types.

VIII. Page Previews with No Screenshots

In some embodiments, the intermediary system 30 may be configured to deliver page previews that do include any screenshots. For example, upon receiving a page request from a user device, the intermediary system 30 could (1) return a cached version of the page as the preview, optionally with modifications to support rapid delivery and rendering, and (2) retrieve the actual page, and then (3) deliver the actual page (with or without modifications) to the browser if it differs (or differs significantly) from the preview. When the actual page is delivered, the browser 50 would display it in place of the preview, as described above. The intermediary system 30 may be configured to use this approach for all pages, or to use it selectively based on an analysis of page content. Where no screenshots are included, the task of generating the preview may include, for example, eliminating scripts, eliminating advertisements, and/or reducing resolutions of embedded images.

VIII. System Implementation and Variations

The intermediary system 30 may be implemented by or on a computing system that comprises one or more physical computing devices (physical servers, storage arrays, routers, etc.), each of which may include a processor and memory. The computing system may, in some cases, include computing devices that are distributed geographically, in which case some of the disclosed server-side tasks may be performed remotely from others. The various functions of the intermediary system 30 may be embodied in code modules executed by the computing system. The code modules may be persistently stored on any type or types of non-transitory computer storage devices or media (magnetic disks, solid state memories, optical drives, etc.). Some or all of the disclosed processes of the intermediary system 30 may alternatively be embodied partly or wholly in specialized computer hardware, such as in custom designed ASICs or FPGAs. The various components and functions of the intermediary system 30 can also be implemented in one or more virtual machines or cloud resources, rather than in dedicated servers. The browser 50 may include executable code stored on any type of non-transitory storage medium, including code for implementing the client-side functions described herein.

In some embodiments, the intermediary system 30 may be omitted. In such embodiments, the browser 50 may be designed or configured to concurrently (1) request/retrieve the actual page from its origin server, and (2) request/retrieve a preview of the page from a separate preview server or system. If the page preview arrives first, the browser may display it while loading the actual page in the background, and then display the actual page in place of the preview once the actual page is fully loaded. The preview server or system in such embodiments may generate and deliver the previews using the same methods as described herein. Preview servers may be set up at a variety of network locations (e.g., points of presence) and geographic locations, in which case they may be statically or dynamically assigned to user devices or page requests according to an algorithm that seeks to minimize response times as seen by users.

Although described in the context of content "pages," the methods disclosed herein are also applicable to other documents and units of content. For example, the disclosed methods can be used to provide previews of Word documents, spreadsheet files, PDF documents, and various other types of documents.

IX. Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   by a computer system comprising one or more server computing devices, wherein individual server computing devices of the one or more server computing devices comprise a processor and a memory storing computer-executable instructions,
   retrieving a page of a content site;
   generating a preview representation of the page, wherein the preview representation comprises a screenshot of at least a portion of the page and markup code, and is at least partially optimized to reduce a loading time, such that a user-perceived loading time of the page is reduced;
   storing the preview representation of the page in a cache of the computer system; and
   subsequently, responding to a request for the page from a user device separate from the one or more server computing devices by at least delivering the preview representation of the page to the user device for temporary display on the user device, wherein the markup code of the preview representation causes the user device to (1) retrieve from the computer system, and display, at least the screenshot, and (2) transmit to the computer system a follow-up request for the page regardless of whether a user interacts with the preview representation; and
   responding to the follow-up request for the page by sending to the user device a non-preview representation of the page, said non-preview representation based on page content retrieved by the computer system;
   wherein the markup code causes the user device to temporarily display the screenshot while loading the non-preview representation of the page.

2. The computer-implemented method of claim 1, wherein the preview representation includes a screenshot of the entire page.

3. The computer-implemented method of claim 1, wherein the preview representation includes a plurality of images, each image comprising a representation of a portion of the page.

4. The computer-implemented method of claim 1, wherein the preview representation includes a non-image representation of a text portion of the page.

5. The computer-implemented method of claim 1, wherein the non-preview representation includes a current version of the page retrieved from a content server.

6. The computer-implemented method of claim 1, wherein the non-preview representation is based at least partly on differences between the preview representation and a current version of the page.

7. The computer-implemented method of claim 1, further comprising generating the preview representation of the page based at least partly on a characteristic of a target user device.

8. The computer-implemented method of claim 7, wherein the characteristic comprises one of display size or display resolution.

9. The computer-implemented method of claim 1, further comprising delivering the preview representation and the non-preview representation to the user device in parallel.

10. The computer-implemented method of claim 1, the markup code causes the user device to display the preview representation, followed by the non-preview representation, in a common browser window.

11. A computer system that acts as an intermediary between user devices and content sites, the computer system comprising one or more server computing devices, wherein individual server computing devices of the one or more server computing devices comprise a processor and a memory storing computer-executable instructions, and wherein the computer system is programmed to perform a process that comprises:
  retrieving a page of a content site;
  generating a preview representation of the retrieved page, wherein the preview representation comprises a screenshot of at least a portion of the retrieved page and markup code, and is at least partially optimized to reduce a loading time, such that a user-perceived loading time of the retrieved page is reduced;
  storing the preview representation in a cache of the computer system; and
  responding to a request for the page from a user device separate from the one or more server computing devices by at least delivering the preview representation of the page to the user device for temporary display on the user device, wherein the markup code of the preview representation instructs the user device to (1) retrieve from the computer system, and display, at least the screenshot, and (2) transmit to the computer system a follow-up request for the page regardless of whether a user interacts with the preview representation; and
  sending to the user device a non-preview representation of the page, said non-preview representation based on page content retrieved by the computer system;
  whereby the markup code causes the user device to temporarily display the screenshot while loading the non-preview representation of the page.

12. The computer system of claim 11, wherein the preview version includes a single screenshot of the entire page.

13. The computer system of claim 11, wherein the preview representation includes a plurality of images, each image comprising a representation of a portion of the page.

14. The computer system of claim 11, wherein the preview representation includes a non-image representation of a text portion of the page.

15. The computer system of claim 11, wherein the preview representation includes an image map.

16. The computer system of claim 11, wherein the preview representation includes layout data regarding the page.

17. The computer system of claim 11, wherein the non-preview representation includes a current version of the page retrieved from a content server.

18. The computer system of claim 11, wherein the non-preview representation includes a cached version of at least a portion of the page.

19. The computer system of claim 11, wherein the non-preview representation is based at least partly on differences between the preview and a current version of the page.

20. The computer system of claim 11 being further programmed to perform a process comprising:
  retrieving the page from the content site and generating the preview of the page according to a schedule.

21. The computer system of claim 11 being further programmed to perform a process comprising:
  generating the preview of the page based at least partly on a characteristic of a target user device.

22. The computer system of claim 21, wherein the characteristic comprises one of display size or display resolution.

23. The computer system of claim 11 being further programmed to perform a process comprising:
  generating the preview of the page based at least partly on content retrieved in response to a request from a second user device.

24. The computer system of claim 11 being further programmed to perform a process comprising:
  delivering the preview representation and the non-preview representation to the user device in parallel.

25. A computer system that acts as an intermediary between user devices and content sites, the computer system comprising one or more server computing devices, wherein individual server computing devices of the one or more server computing devices comprise a processor and a memory storing computer-executable instructions, and wherein the computer system is programmed to at least:
  retrieve a content page from a content site;
  generate a preview version of the content page comprising:
    a screenshot of at least a portion of the content page; and
    markup code comprising a first instruction to transmit a request for the screenshot and a second instruction that causes a follow-up type request for the content page to be transmitted regardless of whether a user interacts with the preview version; and
  in response to a request, received from a user device separate from the one or more server computing devices, for the content page:
    determine whether the request is a follow-up request;
    if the request is not a follow-up request, transmit the markup code to the user device, wherein the markup code instructs the user device to (1) retrieve from the computer system, and display, the screenshot, and (2) transmit to the computer system the follow-up request for the content page regardless of whether user interaction with the preview version occurs on the user device, whereby the markup code causes the user device to temporarily display the screenshot while loading a non-preview version of the content page; and
    if the request is a follow-up request, transmit the non-preview version of the content page to the user device.

26. The computer system of claim 25, further being programmed to:
  generate a preview version of the content page based at least partly on a display characteristic of the user device.

27. The computer system of claim 25, wherein the markup code comprises an image map.

28. The computer system of claim 27, wherein the image map defines clickable areas of the image, the clickable areas corresponding to links on the content page.

29. The computer system of claim 25, wherein the markup code references the content page as a source for a container element.

30. The computer system of claim 25, wherein the follow-up request comprises a URL for the content page, the URL comprising a string indicating that the URL is associated with a follow-up request.

* * * * *